United States Patent
Beisiegel et al.

(10) Patent No.: US 10,042,932 B2
(45) Date of Patent: *Aug. 7, 2018

(54) ANALYTICS BASED ON PIPES PROGRAMMING MODEL

(71) Applicant: International Business Machines Corporation, Armonk, NY (US)

(72) Inventors: Michael Beisiegel, Poughkeepsie, NY (US); Dinakaran Joseph, Apex, NC (US); Devaprasad K. Nadgir, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,253

(22) Filed: Aug. 21, 2015

(65) Prior Publication Data

US 2015/0363501 A1    Dec. 17, 2015

Related U.S. Application Data

(63) Continuation of application No. 13/853,700, filed on Mar. 29, 2013, now Pat. No. 9,268,854.

(51) Int. Cl.
*G06F 17/30* (2006.01)
*H04L 29/08* (2006.01)

(52) U.S. Cl.
CPC .. *G06F 17/30864* (2013.01); *G06F 17/30696* (2013.01); *G06F 17/30867* (2013.01); *H04L 67/02* (2013.01)

(58) Field of Classification Search
CPC ......... G06F 17/30864; G06F 17/30696; G06F 17/30867; H04L 67/02
See application file for complete search history.

(56) References Cited

U.S. PATENT DOCUMENTS 6,338,059 B1    1/2002    Fields et al.
7,290,048 B1    10/2007   Barnett et al.
(Continued)

FOREIGN PATENT DOCUMENTS

WO    2011/153171 A2    8/2011
WO    2012/162816 A1    12/2012

OTHER PUBLICATIONS

Charlie Berger, Oracle Advanced Analytics: Oracle R Enterprise & Oracle Data Mining, Product Presentation, 2012, pp. 1-58, Oracle Corporation, Published online at: http://www.oracle.com/technetwork/database/options/advanced-analytics/pres-oracle-advanced-analytics-1559495.pdf.

(Continued)

*Primary Examiner* — Jared M Bibbee
(74) *Attorney, Agent, or Firm* — Lee Law, PLLC; Christopher B. Lee

(57) ABSTRACT

A hypertext transfer protocol (HTTP) request that includes embedded scripted code that specifies requested data search, search result data manipulation, and manipulated search result data visualization processing is received at a server. The received embedded scripted code that specifies the requested data search, search result data manipulation, and manipulated search result data visualization processing is executed. Visualized manipulated search results are generated as output of the execution of the received embedded scripted code. The visualized manipulated search results are returned in response to receiving the HTTP request that includes the embedded scripted code.

20 Claims, 7 Drawing Sheets

(56) References Cited

U.S. PATENT DOCUMENTS

| | | | |
|---|---|---|---|
| 8,176,440 | B2 | 5/2012 | Stading |
| 8,429,243 | B1* | 4/2013 | Wang ................. G06Q 30/0246 709/217 |
| 2004/0143564 | A1* | 7/2004 | Gross ................. G06F 17/30398 |
| 2006/0101048 | A1 | 5/2006 | Mazzagatti et al. |
| 2009/0089248 | A1* | 4/2009 | Alexander ........ G06F 17/30899 |
| 2010/0037161 | A1* | 2/2010 | Stading ............... G06F 17/3043 715/764 |
| 2010/0138544 | A1 | 6/2010 | Guo et al. |
| 2011/0239288 | A1* | 9/2011 | Cross ...................... G06F 21/51 726/11 |
| 2012/0022916 | A1 | 1/2012 | Todd et al. |
| 2012/0296918 | A1* | 11/2012 | Morris .............. G06F 17/30657 707/748 |
| 2014/0059109 | A1 | 2/2014 | Jugel |

OTHER PUBLICATIONS

Jean-Pierre Dijcks, Oracle: Big Data for the Enterprise, White Paper, Jan. 2012, pp. 1-16, Oracle Corporation, Published online at: http://www.oracle.com/us/products/database/big-data-for-enterprise-519135.pdf.

Author Unknown, Rest API Overview: The Splunk REST API, Webpage/site, Printed from website on Mar. 27, 2013, pp. 1-4, Splunk Inc., Published online at: http://dev.splunk.com/view/rest-api-overview/SP-CAAADP8.

Author Unknown, What is Loggly? —Simplify Log Management, Webpage/site, Printed from website on Mar. 27, 2013, pp. 1-2, Loggly, Inc., Published online at: http://www.loggly.com/.

United States Patent and Trademark Office, Office Action for U.S. Appl. No. 13/853,700, dated Dec. 29, 2014, pp. 1-20, Alexandria, VA, USA.

Dominik Kaspar, et al., Using HTTP Pipelining to Improve Progressive Download over Multiple Heterogeneous Interfaces, Proceedings of the IEEE International Conference on Communications, May 2010, pp. 1-5, IEEE, Cape Town, South Africa.

Changhao Jiang, BigPipe: Pipelining web pages for high performance, Article, Jun. 4, 2010, pp. 1-8, Facebook Inc., Published online at: https://www.facebook.com/notes/facebook-engineering/bigpipe-pipelining-web-pages-for-high-performance/389414033919.

Michael I. Gordon, et al., Exploiting Coarse-Grained Task, Data, and Pipeline Parallelism in Stream Programs, Proceedings of the 12th International Conference on Architectural Support for Programming Languages and Operating Systems, Oct. 2006, pp. 151-162, Association for Computing Machinery, New York, NY, USA.

Benjamin Kerensa, Learn How to Speed Up Page Loading in Firefox, Article, Nov. 12, 2012, pp. 1-7, Benjamin Kerensa, Published online at: http://benjaminkerensa.com/2012/11/12/learn-how-to-speed-up-page-loading-in-firefox.

Author Unkown, pChart Features: Charting Functions, Archived Webpage, Oct. 14, 2011, pp. 1-3, Published at: http://web.archive.org/web/20111014141356/http://pchart.net/features-charting.

Brian Pane, Will HTTP pipelining help? A study based on the HTTPArchive.org data set, Web Posting, Jul. 19, 2011, pp. 1-9, Brian Pane, Published online at: http://www.brianp.net/2011/07/19/will-pipelining-help-a-study-based-on-the-httparchive-org-data-set/.

United States Patent and Trademark Office, Notice of Allowance for U.S. Appl. No. 13/853,700, dated May 22, 2015, pp. 1-12, Alexandria, VA, USA.

United States Patent and Trademark Office, Supplemental Notice of Allowance for U.S. Appl. No. 13/853,700, dated Jun. 10, 2015, pp. 1-6, Alexandria, VA, USA.

United States Patent and Trademark Office, Office Action for U.S. Appl. No. 14/222,246, dated May 15, 2015, pp. 1-22, Alexandria, VA, USA.

United States Patent and Trademark Office, Notice of Allowance for U.S. Appl. No. 14/222,246, dated Sep. 16, 2015, pp. 1-12, Alexandria, VA, USA.

* cited by examiner

400
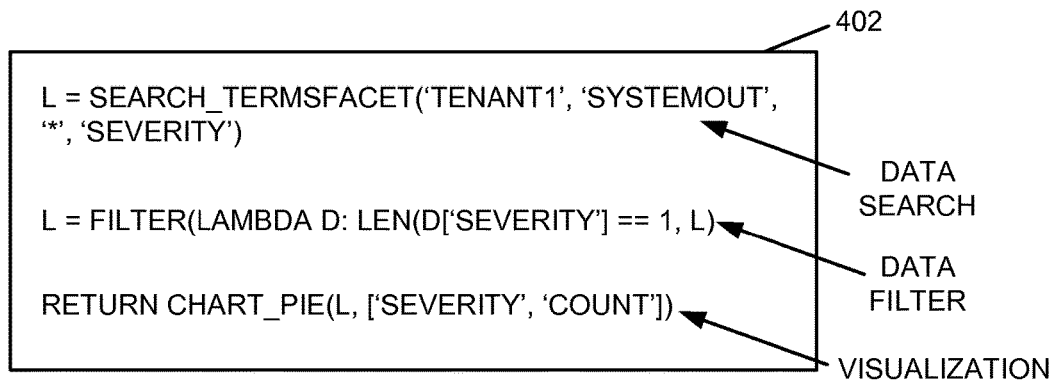
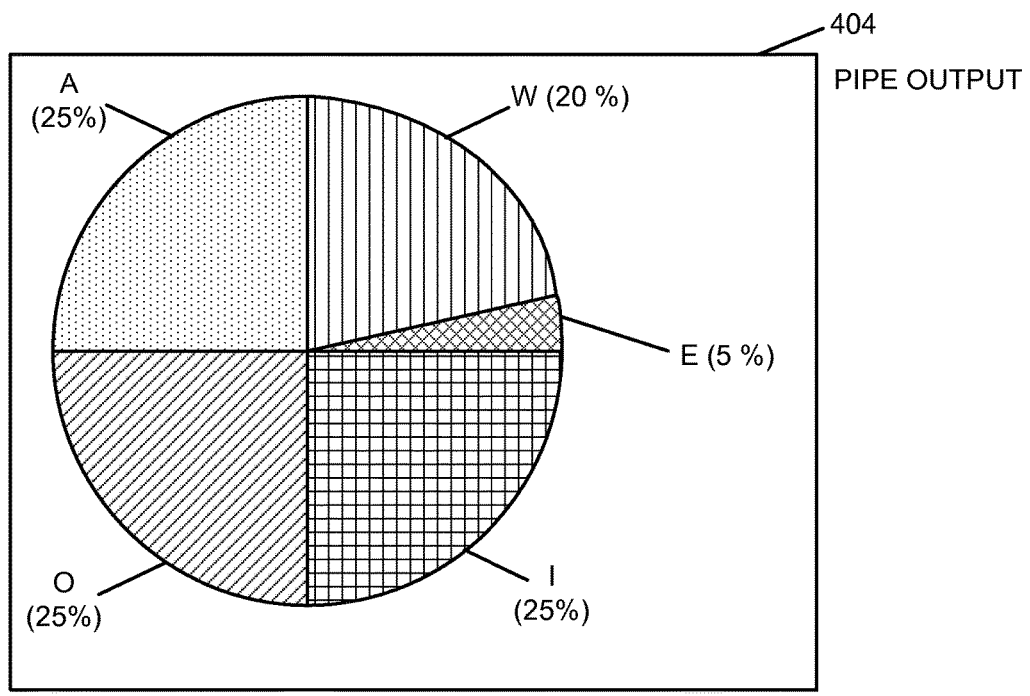
FIG. 4

US 10,042,932 B2

ANALYTICS BASED ON PIPES PROGRAMMING MODEL

BACKGROUND

The present invention relates to analytics. More particularly, the present invention relates to analytics based on a pipes programming model.

Analytics involves the analysis of data. Analytics may involve determinations of types of information in data sets, and identification of subsets of information within the data sets. Analytical quantities that represent the determined information types and subsets within data sets may be created and further evaluated.

SUMMARY

A method includes receiving, at a server, a hypertext transfer protocol (HTTP) request that comprises embedded scripted code that specifies requested data search, search result data manipulation, and manipulated search result data visualization processing; executing the received embedded scripted code that specifies the requested data search, search result data manipulation, and manipulated search result data visualization processing; generating visualized manipulated search results as output of the execution of the received embedded scripted code that specifies the requested data search, search result data manipulation, and manipulated search result data visualization processing; and returning the visualized manipulated search results in response to receiving the HTTP request that comprises the embedded scripted code that specifies the requested data search, search result data manipulation, and manipulated search result data visualization processing.

A system includes a communication interface and a processor programmed to: receive, via the communication interface, a hypertext transfer protocol (HTTP) request that comprises embedded scripted code that specifies requested data search, search result data manipulation, and manipulated search result data visualization processing; execute the received embedded scripted code that specifies the requested data search, search result data manipulation, and manipulated search result data visualization processing; generate visualized manipulated search results as output of the execution of the received embedded scripted code that specifies the requested data search, search result data manipulation, and manipulated search result data visualization processing; and return the visualized manipulated search results in response to receiving the HTTP request that comprises the embedded scripted code that specifies the requested data search, search result data manipulation, and manipulated search result data visualization processing.

A computer program product includes a computer readable storage medium having computer readable program code embodied therewith, where the computer readable program code when executed on a computer causes the computer to receive a hypertext transfer protocol (HTTP) request that comprises embedded scripted code that specifies requested data search, search result data manipulation, and manipulated search result data visualization processing; execute the received embedded scripted code that specifies the requested data search, search result data manipulation, and manipulated search result data visualization processing; generate visualized manipulated search results as output of the execution of the received embedded scripted code that specifies the requested data search, search result data manipulation, and manipulated search result data visualization processing; and return the visualized manipulated search results in response to receiving the HTTP request that comprises the embedded scripted code that specifies the requested data search, search result data manipulation, and manipulated search result data visualization processing.

BRIEF DESCRIPTION OF THE DRAWINGS

FIG. 4 is a diagram of an example of an implementation of a piped HTTP request scripted code input and piped HTTP response visualized data output for performing analytics based on a pipes programming model according to an embodiment of the present subject matter;

DETAILED DESCRIPTION

Figure 1:
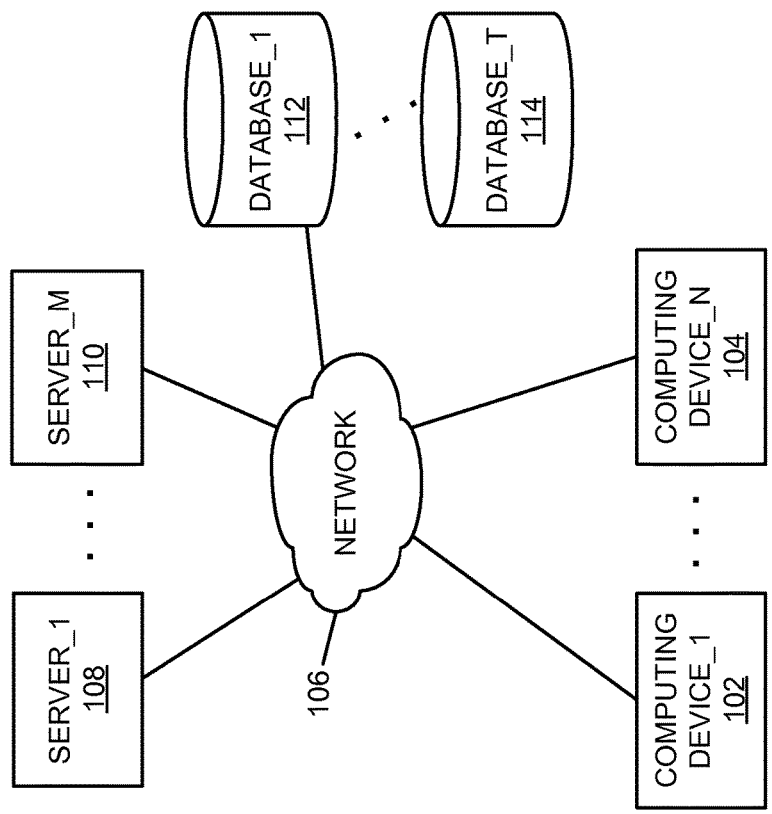
FIG. 1 is a block diagram of an example of an implementation of a system for providing analytics based on a pipes programming model according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides analytics based on a pipes programming model. The present technology introduces a concept termed herein as a "pipe." A pipe, as described herein, represents a logical construct that includes search and visualization instructions defined within a supporting programming/scripting language syntax (e.g., Python®, though many others are possible). A new "pipes programming model" is also described herein. The pipes programming model provides an architecture that defines and executes a "pipe" with a sequential search, modification/cleansing of searched data, and visualization of the data using a single thread request/response paradigm. As such, the pipes programming model provides compartmentalized processing of several analytical operations on data and the return of results of the analytical operations using a single hypertext transfer protocol (HTTP) request, a single HTTP thread of operation at an HTTP server, and a single HTTP response from the server by the single server HTTP thread.

A "piped HTTP request," as described herein, represents an HTTP request that includes/encapsulates scripted code that is requested to be executed against a data set by the HTTP server under the single thread of operation. The execution of the scripting language may be performed in a native scripting language runtime associated with the scripted code by the single thread of operation. A "piped HTTP response," as described herein, represents an HTTP response that includes/encapsulates the results of execution of scripted code returned by the single HTTP thread that are created in response to receipt of the piped HTTP request. The scripted code may include scripted syntax executable to perform search functions, data manipulation functions, and data visualization functions. As such, the pipes programming model described herein provides a comprehensive solution to data analytics that may improve data analysis for data sets, including large distributed data sets.

A web application is utilized herein as an example of a source platform within which a pipes programming model may be implemented and where a user may configure and initiate piped HTTP requests for analytics, as described above and in more detail below. A middleware analytics platform is utilized herein as a target platform within which the pipes programming model may be implemented and where piped HTTP requests may be executed. It is understood that other platform possibilities exist that may be utilized as a source and target platform for implementation of the pipes programming model and all such possibilities are considered within the scope of the present technology.

The search may include a distributed, batch-oriented search that is requested to be performed within the piped HTTP request using embedded scripted code within the piped HTTP request. The distributed, batch-oriented search may be performed by the HTTP server under a single thread of operation across distributed and local data nodes to query for the search results (e.g., search hits). The result of this search may be manipulated under the same thread of operation as specified by the scripted code within the HTTP request. The results of the search and/or data manipulation may be visualized through charting libraries, again under the same thread of operation and as also specified by the scripted code within the piped HTTP request. The manipulated and/or visualized search results may be returned as the response to the piped HTTP request, again under the same thread of operation. As such, a single HTTP request may be processed by an HTTP server to perform search, data manipulation, and data visualization operations on behalf of the user requesting the piped HTTP request. The results of the piped HTTP request may be rendered on a display device or other rendering output may be generated, and the rendered output may be presented to the user. Accordingly, data analytics may be improved by use of the pipes programming model described herein.

Scripting languages, such as Python®, JavaScript®, PHP: Hypertext Preprocessor (PHP), and Perl scripting languages, may be used as the scripting language within which the scripted code within the piped HTTP request is syntactically formulated/created. Other scripting languages may also be used, as appropriate for a given implementation. As described above, and in more detail below, the scripted code is used in combination with the piped HTTP request and distributed search technologies to provide descriptive analytics for search and visualization of complex data.

As described above, a piped HTTP request results in creation of a new thread within the target platform that implements the pipes programming model. The target platform may alternatively be referred to as a middleware analytics platform. The target platform executes the pipes that are requested. The newly-created thread interprets the instructions provided in the respective sequential scripting language that defines the pipe and executes the pipe in association with the target platform. For purposes of the examples herein, there are primarily three types of instructions in a pipe, though other types may be utilized as appropriate for a given implementation. A first type of instruction in a pipe includes a search function. A second type of instruction in a pipe includes a data manipulation function. A third type of instruction in a pipe includes a data visualization function.

Regarding possible search functions, search_hits (e.g., searches for raw results based on a search criteria), search_termfacet (e.g., searches for facets or distribution of values across a specific field), search_datetimehistogram (e.g., searches for distribution of events across a histogram defined by date and time of the documents), and similar search specifications represent example search functions that may be utilized to implement a search of complex data using a single HTTP thread within the target platform. Regarding possible data manipulation functions, sort (e.g., sorting of received results based on value of fields), filter (e.g., filtering out unwanted noise in the results obtained using search functions), map (e.g., re-ordering different values in a way that may more-easily/understandably be visualized), group (e.g., aggregating received results into groups based on a characteristic of the data), and similar data manipulation specifications represent example data manipulation functions that may be utilized to implement data manipulation of search results of complex data using the single HTTP thread within the target platform. Regarding possible data visualization functions, chart_pie (e.g., visualizing as a pie chart to visualize value distribution), chart_stats (e.g., visualizing minimum, maximum and mean values), chart_chord (e.g., visualizing chord distribution of various data types to indicate relationships), chart_heatmap (e.g., visualizing heat map distribution of the values represented in the search results, such as memory utilization across servers), chart_timeline (e.g., visualizing a timeline chart showing a sequence of events in a timeline), chart_horizon (e.g., visualizing variations of values shown in a timeline), and similar data visualization specifications represent example data visualization functions that may be utilized to implement visualized output of manipulated search results of complex data using the single HTTP thread within the target platform. It should also be noted that while the example functions described above are utilized for purposes of example, other search functions, data manipulation functions, and data visualization functions are possible and all such functions are considered within the scope of the present subject matter.

It should be noted that conception of the present subject matter resulted from recognition of certain limitations associated with data analytics. For example, it was observed that data searched is often cryptic and in a format that is difficult to visualize using graphs and charts. Additionally, it was observed that the data search results often need to be manipulated, such as by being cleansed (e.g., to remove noise such as data elements that are improperly formatted), and re-formatted in different combinations, to provide effective descriptive analytics capabilities. Further, it was observed that searches often become more and more complicated which requires end-users to de-couple searching of large and distributed data stores (e.g., collectively big data) into batch oriented programs that add an additional burden on the analytics and that do not provide real-time insights with respect to the data through visualization to the end-users. The present subject matter improves data analytics by providing analytics based on a pipes programming model, as described above and in more detail below. As such, improved data analytics may be obtained through use of the technology described herein.

The analytics based on a pipes programming model described herein may be performed in real time to allow prompt visualization of complex data searches, data manipulation, and analytical data visualization. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for providing analytics based on a pipes programming model. A computing device_1 102 through a computing device_N 104 communicate via a network 106 with several other devices. The other devices include a server_1 108 through a server_M 110. A database_1 112 through a database_T 114 represent physical storage locations of data, that may include complex distributed data that may be processed using the pipes programming model as described herein.

As will be described in more detail below in association with FIG. 2 through FIG. 7, the computing device_1 102 through the computing device_N 104 and the server_1 108 through the server_M 110 may each provide automated analytics based on a pipes programming model. The automated analytics based on a pipes programming model is based upon initiation of a piped HTTP request that includes scripted code by, for example, one of the computing device_1 102 through the computing device_N 104 to one of the server_1 108 through the server_M 110. Receipt of the piped HTTP request causes the respective server to create a single piped HTTP thread to process the piped HTTP request. Processing of the piped HTTP request may include processing as configured within the scripted code that is encapsulated within the piped HTTP request, and the processed results are returned by the single piped HTTP thread to the requesting computing device. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

Figure 2:
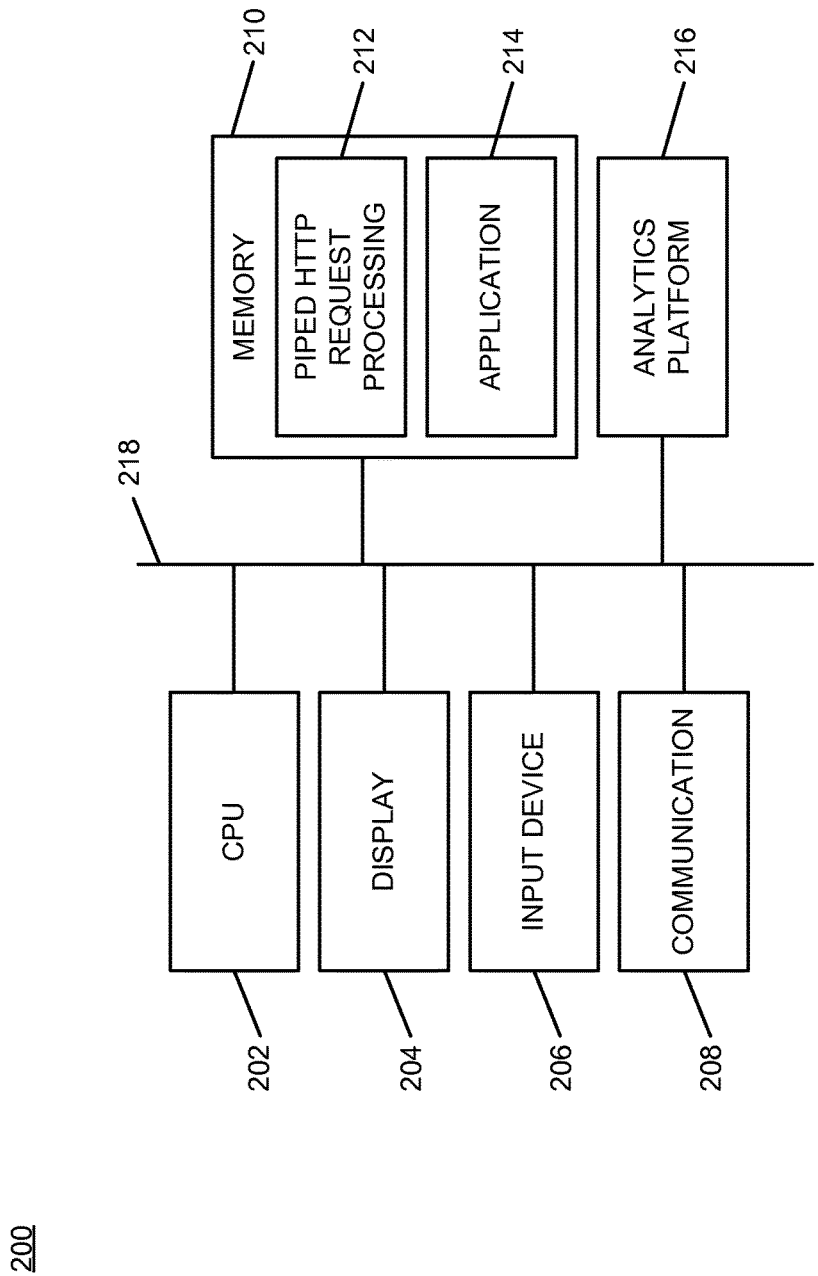
FIG. 2 is a block diagram of an example of an implementation of a core processing module capable of performing analytics based on a pipes programming model according to an embodiment of the present subject matter.

FIG. 2 is a block diagram of an example of an implementation of a core processing module 200 capable of performing analytics based on a pipes programming model. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of piped HTTP requests in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, such as in association with the server_1 108 through the server_M 110. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a piped HTTP request processing storage area 212 that provides storage for processing of piped HTTP requests in association with the core processing module 200. For example, where the core processing module 200 is associated with the computing device_1 102 through the computing device_N 104, the piped HTTP request processing storage area 212 may be used for the creation of piped HTTP requests. Similarly, where the core processing module 200 is associated with the server_1 108 through the server_M 110, the piped HTTP request processing storage area 212 may be used to store and process received piped HTTP requests.

An application area 214 provides storage and execution space for one or more applications executed, for example, by the CPU 202. The application area 214 may execute an application, for example in association with the computing device_1 102 through the computing device_N 104, to create and send piped HTTP requests to one or more of the server_1 108 through the server_M 110. Such an application may also receive piped HTTP responses and render the received and processed data using the display 204 or other output device.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An analytics platform module 216 is also illustrated. The analytics platform module 216 provides processing capabilities for processing of piped HTTP requests for the core processing module 200, as described above and in more detail below. The analytics platform module 216 implements the analytics based on a pipes programming model of the core processing module 200. The examples described herein utilize the analytics platform module 216 in association with the server_1 108 through the server_M 110 to process piped HTTP requests created and received from the computing device_1 102 through the computing device_N 104. However, it is understood that the analytics platform module 216 may be implemented in association with one or more of the computing device_1 102 through the computing device_N 104, as appropriate for the given implementation.

It should also be noted that the analytics platform module 216 may form a portion of other circuitry described without departure from the scope of the present subject matter. Further, the analytics platform module 216 may alternatively be implemented as an application stored within the memory 210. In such an implementation, the analytics platform module 216 may include instructions executed by the CPU 202 for performing the functionality described herein. The CPU 202 may execute these instructions to provide the processing capabilities described above and in more detail below for the core processing module 200. The analytics platform module 216 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the analytics platform module 216 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 through the database 114 are illustrated as separate components for purposes of example within FIG. 1, the information stored within one or more of the respective databases may also/alternatively be stored within the memory 210 without departure from the scope of the present subject matter. Accordingly, the core processing module 200 may take many forms and may be associated with many platforms.

Figure 3:
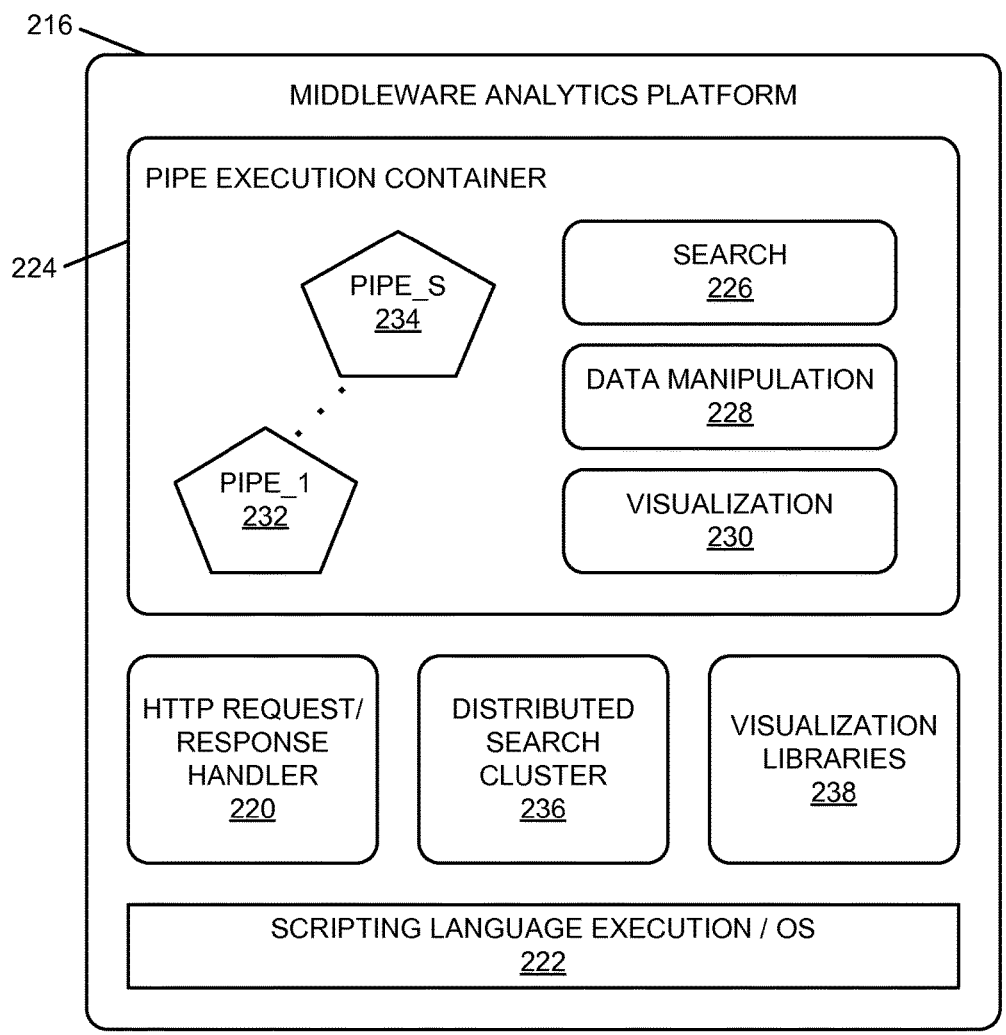
FIG. 3 is a block diagram of an example of an implementation of additional details associated with the analytics platform module of FIG. 2 for performing analytics based on a pipes programming model according to an embodiment of the present subject matter.

FIG. 3 is a block diagram of an example of an implementation of additional details associated with the analytics platform module 216 of FIG. 2 for performing analytics based on a pipes programming model. As described above, piped HTTP requests include scripted code that is requested to be executed against a data set by an HTTP server under a single thread of operation. The analytics platform module 216 may be implemented in a variety of technologies, such as a middleware analytics platform.

The analytics platform module 216 includes an HTTP request/response handler 220. In response to receiving a piped HTTP request, the HTTP request/response handler 220 processes the initial piped HTTP request by creating a thread to process the request. The created thread understands the programmatic semantics of the scripted code defined in the pipe to perform data searches, data manipulation, and data visualization, as specified by the scripted code in the piped HTTP request. The instructions represented by the scripted code in the piped HTTP request are executed by the single coordinated thread initiated by the HTTP request/response handler 220 using a scripting language execution/operating system (OS) module 222.

As such, the HTTP request/response handler 220 detects that a piped HTTP request has been received, interprets the request, determines that the request includes scripted code (e.g., is a piped HTTP request), and creates a piping function with the created thread to implement single-threaded execution of the various scripted code segments within the piped HTTP request and to respond as a single threaded piped HTTP response to the initial piped HTTP request.

The analytics platform module 216 additionally includes a pipe execution container 224 that includes a pipe execution engine composed of a search engine 226, a data manipulation engine 228, and a visualization engine 230. The pipe execution container 224 specifies how multiple concurrently-executing pipes, represented by the pipe_1 232 through the pipe_S 234, are to be defined for execution by the search engine 226, the data manipulation engine 228, and the visualization engine 230. The pipe execution container 224 defines how syntax is to be constructed for execution of the piped HTTP requests, and also executes the received piped HTTP requests using modules in the pipe execution container 224 itself, as described in more detail below. As such, the pipe execution container 224 specifies interface definition and execution capabilities for piped HTTP requests, determines that configured interface processing syntactic specifications are satisfied by received piped HTTP requests, and executes compliant piped HTTP requests as described above and in more detail below. As represented within FIG. 3, multiple single-threaded piped HTTP requests may be processed concurrently by the creation of multiple pipes 232 through 234 within the pipe execution container 224.

Regarding data searches specified within the scripted code in the piped HTTP request, the created thread is configured to understand how to perform a data search using the search engine 226. The created thread converts the data search scripted code for the designated search function into search semantics, as appropriate for a given implementation, that may be understood by a search engine, such as the search engine 226, and initiates the data search as specified by the scripted code within the piped HTTP request. A search request may be sent, for example, to a distributed search cluster 236. This data search processing may be implemented as a blocking call on the created thread. As such, the results of the data search may be returned to the created thread for additional processing, as specified by the scripted code within the piped HTTP request and as described in more detail below.

Once the data search results have been received, the next set of instructions within the scripted code in the piped HTTP request represents the requested data manipulation functions. Native scripting language power may be leveraged and used for manipulation of raw data returned by the data search execution, again as part of the single-threaded piped HTTP request/response sequence using the data manipulation engine 228. As described above, the data manipulation processing may include, for example, filtering or other data manipulation, as appropriate for a given implementation.

Once the data manipulation processing has been completed, the third step to complete the processing of the piped HTTP request is to utilize the visualization engine 230 to feed the cleansed/manipulated data from the previous data manipulation processing into one or more visualization libraries 238 to process the data with visualization library functions to create graphs/charts for visualization.

As such, the analytics platform module 216 provides single-threaded execution of piped HTTP requests for search, data manipulation using native scripting language, and data visualization using visualization libraries. The HTTP requests result in a single-threaded management task encompassing a distributed search, manipulation of data, and data visualization. The analytics platform module 216 provides a framework through which a pipe that includes scripted code for search, data manipulation, and visualization are executed within a pipes programming model.

FIG. 4 is a diagram 400 of an example of an implementation of a piped HTTP request scripted code input 402 and piped HTTP response visualized data output 404 for performing analytics based on a pipes programming model. As can be seen from FIG. 4, piped HTTP request scripted code input 402 includes three lines of scripted code that respectively represent a data search, data manipulation in the form of data filtering, and data visualization that specifies a pie chart output using visualization libraries. The pseudo syntax represented within FIG. 4 may be considered to represent a pseudo implementation of scripted code that is based on the Python® scripting language implementation, though as described above any scripting language may be utilized to implement the present technology as appropriate for a given implementation.

The lines of scripted code represented by the piped HTTP request scripted code input 402 of FIG. 4 may be entered by a user of the present technology in the form of an HTTP POST instruction formed similarly to the pseudo syntax HTTP POST instruction shown below.

HTTP POST server.com/service/pipe
body start
L=SEARCH_TERMSFACET('TENANT1', 'SYSTEMOUT', '*', 'SEVERITY')
L=FILTER(LAMBDA D: LEN(D['SEVERITY'])==1, L)
return CHART_PIE(L, ['SEVERITY', 'COUNT'])
body end As can be seen within the pseudo syntax of the HTTP POST instruction above, the first instruction in the "pipe" uses the native execution of Python® scripting language code to specify a data search. A search has been requested within a multi-tenant database for a tenant identified as "TENANT1." The variable "SYSTEMOUT" represents logs generated by an application server that are to be searched. It should be noted that many types of data may be stored, such as finance data and other forms of data, and that different types of logs may be generated and audited/searched. The wildcard symbol "*" indicates that the search is specified against all available data in the logs specified by the SYSTEMOUT variable. The "SEVERITY" indicator specifies that a distribution of severity across all of the data has been requested, such as how many times did a "severity field" within the searched logs have any indication of errors, warnings, or other information captured. The variable "L" is used to store the returned search results for further processing by the data manipulation processing of the pipe.

The second instruction in the pipe uses the native execution of Python® scripting language code to filter as the data manipulation which is specified within the pseudo syntax of the HTTP POST instruction to be a "FILTER" function. The filtering is specified to filter out noise in the data (e.g., data elements that are improperly formatted) by removing all the search hits where the results contain more than one (1) character (where properly formatted data is considered to be data of one character). For purposes of the present example, it is assumed that the "severity field" within the searched logs is configured to have one character if valid data is present. As such, more than one character indicates noise within in the search results and such search results are removed prior to visualization. The results of the filtering are again assigned to the variable "L" to store the returned search results for further processing and visualization of the pipe.

The third instruction in the pipe takes the result from the previous data manipulation step and outputs a pie chart with the data filtered as returned by the search. The "CHART_PIE" instruction operates to invoke a charting library and selection of a pie chart as the specified visualized output of the pipe that is returned by the piped HTTP response. The piped HTTP response visualized data output 404 represents an example output of visualized and manipulated search results.

It should be noted that the numbers selected for the portions of the pie chart are selected for ease of illustration only and the drawing is not considered to be to scale. For purposes of example, it should be noted that a "severity" field/variable may have several values. As such, a representative search may determine from the severity variable that Application, as represented by the variable "A," constitutes twenty-five percent (25%) of the search results. Also from the severity variable, Output, as represented by the variable "O," constitutes twenty-five percent (25%) of the search results. Warnings, as represented by the variable "W," constitutes twenty percent (20%) of the search results. Errors, as represented by the variable "E," constitutes five percent (5%) of the search results. Lastly, information entries, as represented by the variable "I," constitutes twenty-five percent (25%) of the search results. Again, the numbers utilized in this example are for ease of illustration only and the drawing is not considered to be to scale.

The piped HTTP response visualized data output 404 may be rendered on a display of a computing device utilized by the user to issue the piped HTTP request. As such, the present technology provides advanced data search, data manipulation, and data visualization capabilities. A single piped HTTP invocation results in the execution of a scripting language-based distributed search, a scripting language-based manipulation of searched data, and a scripting language-based visualization of the manipulated search results.

Figure 5:
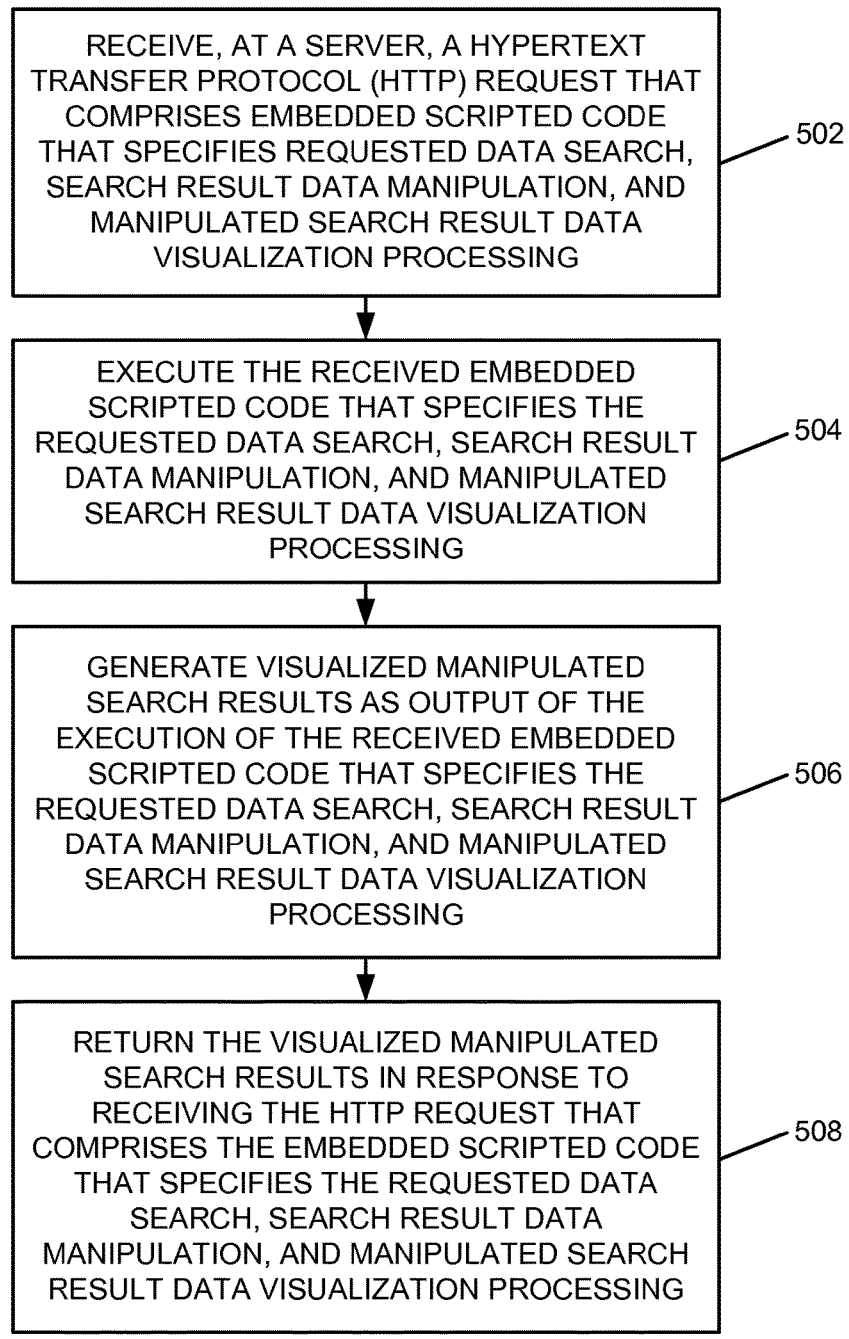
FIG. 5 is a flow chart of an example of an implementation of a process for performing analytics based on a pipes programming model according to an embodiment of the present subject matter.
Figure 6:
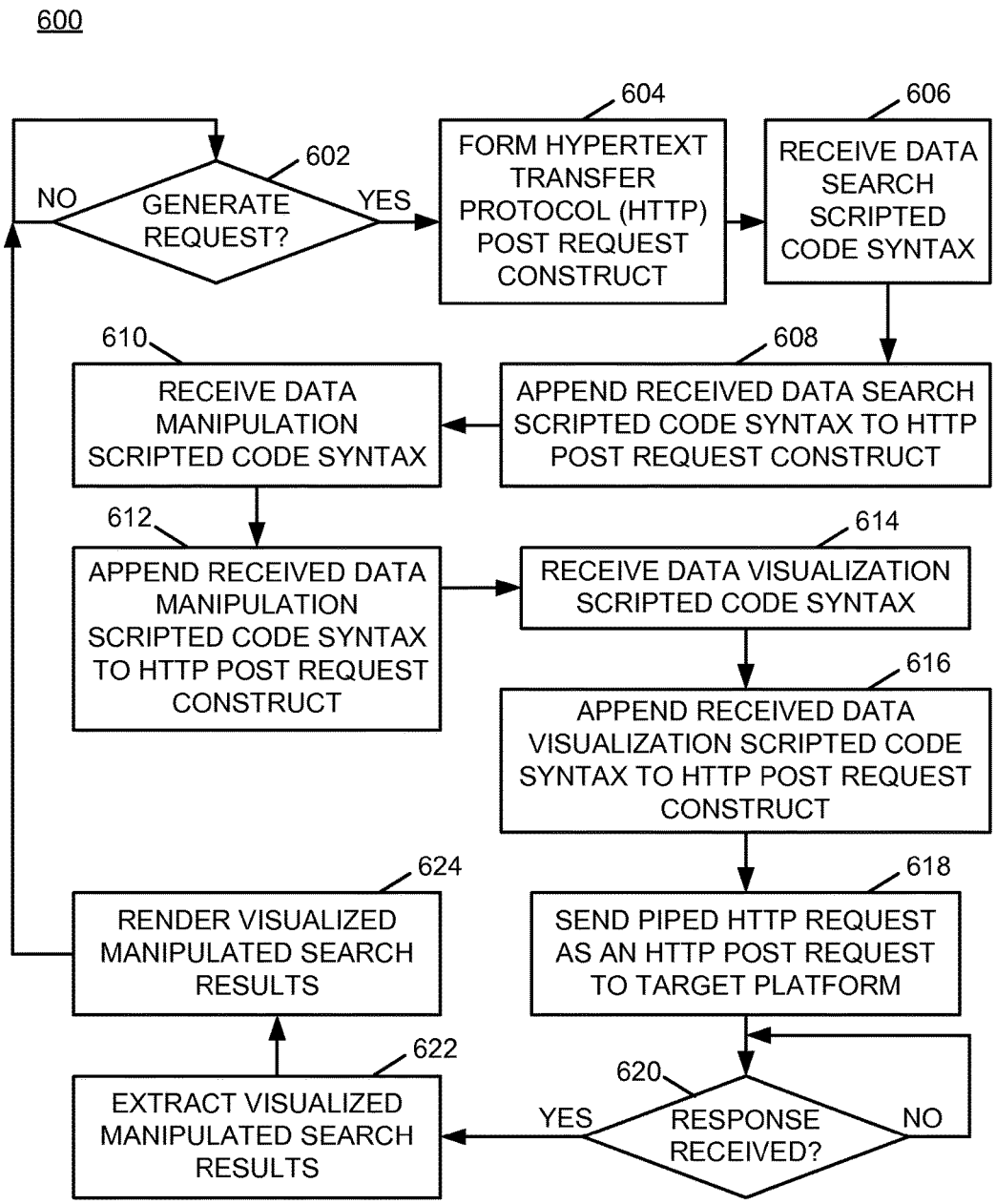
FIG. 6 is a flow chart of an example of an implementation of a process for initiating piped hypertext transfer protocol (HTTP) requests to request analytics based on a pipes programming model according to an embodiment of the present subject matter.
Figure 7:
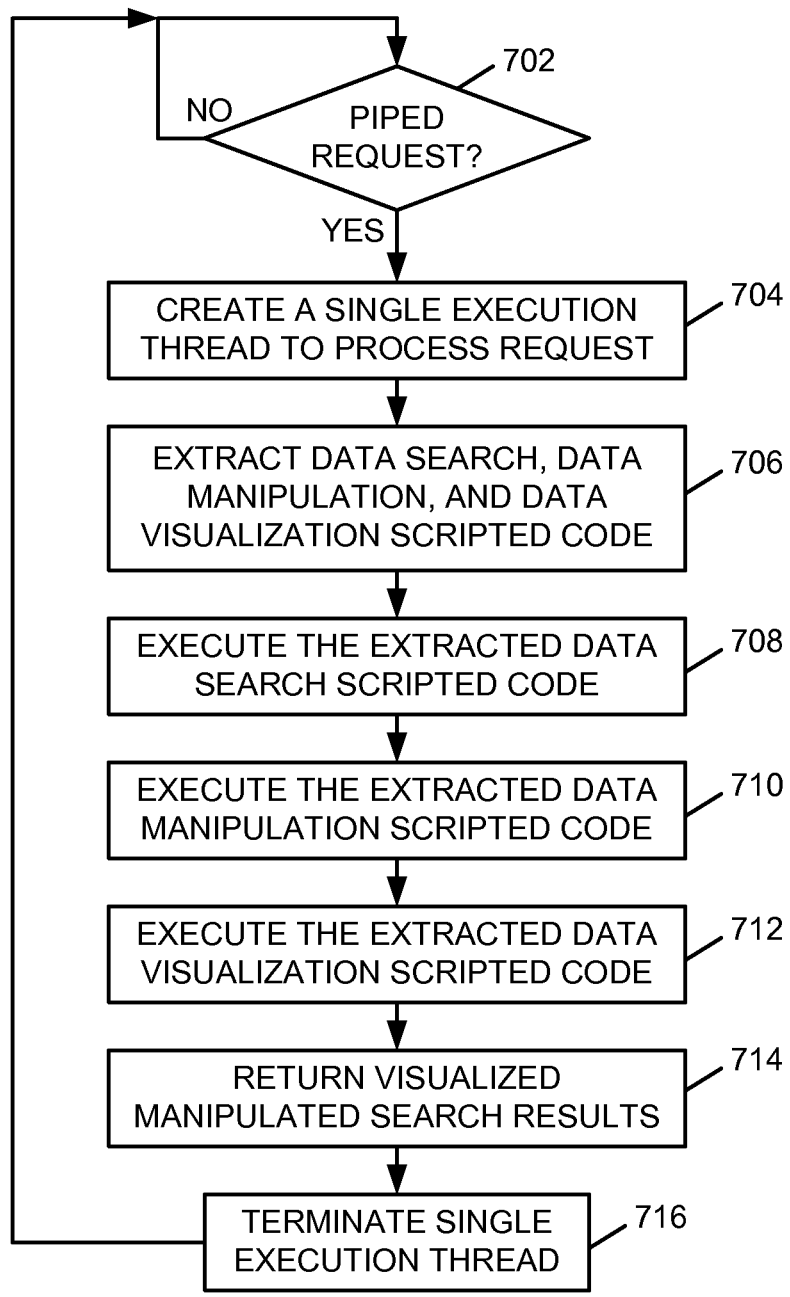
FIG. 7 is a flow chart of an example of an implementation of a process for processing piped hypertext transfer protocol (HTTP) requests and performing analytics based on a pipes programming model according to an embodiment of the present subject matter.

FIG. 5 through FIG. 7 described below represent example processes that may be executed by devices, such as the core processing module 200, to perform the analytics based on a pipes programming model associated with the present subject matter. Many other variations on the example processes are possible and all are considered within the scope of the present subject matter. The example processes may be performed by modules, such as the analytics platform module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for performing analytics based on a pipes programming model. At block 502, the process 500 receives, at a server, a hypertext transfer protocol (HTTP) request that comprises embedded scripted code that specifies requested data search, search result data manipulation, and manipulated search result data visualization processing. At block 504, the process 500 executes the received embedded scripted code that specifies the requested data search, search result data manipulation, and manipulated search result data visualization processing. At block 506, the process 500 generates visualized manipulated search results as output of the execution of the received embedded scripted code that specifies the requested data search, search result data manipulation, and manipulated search result data visualization processing. At block 508, the process 500 returns the visualized manipulated search results in response to receiving the HTTP request that comprises the embedded scripted code that specifies the requested data search, search result data manipulation, and manipulated search result data visualization processing.

FIG. 6 is a flow chart of an example of an implementation of a process 600 for initiating piped hypertext transfer protocol (HTTP) requests to request analytics based on a pipes programming model. At decision point 602, the process 600 makes a determination as to whether a request to generate a piped HTTP request has been detected, such as from a user of a computing device such as one of the computing device_1 102 through the computing device_N 104. The examples of FIG. 6 utilize the example pseudo syntax described above in association with FIG. 4.

Returning to the description of decision point 602, in response to determining that a request to generate a piped HTTP request has been detected, the process 600 forms an HTTP POST request construct at block 604, such as described above in association with FIG. 4, where the HTTP POST server.com/service/pipe is followed, in a new line, by "body start." At block 606, the process 600 receives data search scripted code syntax from the user, such as the syntax "L=SEARCH_TERMSFACET('TENANT1', 'SYSTEM-OUT', '*', 'SEVERITY')" described above. The process 600 may detect a "return" key/new line entry or "enter" key depressed by the user to determine that the scripted text entry for the data search scripted code syntax of the piped HTTP request has been completed. At block 608, the process 600 appends the received data search scripted code syntax to the HTTP POST request construct.

At block 610, the process 600 receives data manipulation scripted code syntax from the user, such as the syntax "L=FILTER(LAMBDA D: LEN(D['SEVERITY']==1, L)" described above. The process 600 may detect a "return" key/new line entry or "enter" key depressed by the user to determine that the scripted text entry for the data manipulation scripted code syntax of the piped HTTP request has been completed. At block 612, the process 600 appends the received data manipulation scripted code syntax to the HTTP POST request construct.

At block 614, the process 600 receives data visualization scripted code syntax from the user, such as the syntax "CHART_PIE(L, ['SEVERITY', 'COUNT'])" described above. The process 600 may detect entry of the word "return" by the user as an indication that the HTTP POST request is completed by this entry, and may detect entry of a "return" key/new line entry or "enter" key depressed by the user to determine that the scripted text entry for the data visualization scripted code syntax of the piped HTTP request has been completed. At block 616, the process 600 appends the received data virtualization scripted code syntax to the HTTP POST request construct and appends the "body end" to the HTTP POST request to form the piped HTTP request.

At block 618, the process 600 sends the piped HTTP request as an HTTP POST request to the target platform, as described above. At decision point 620, the process 600 makes a determination as to whether a piped HTTP response has been received from the target platform. In response to determining that the piped HTTP response has been received from the target platform, the process 600 extracts the visualized manipulated search results from the piped HTTP response at block 622. At block 624, the process 600 renders the visualized manipulated search results. The process 600 returns to decision point 602 and iterates as described above.

As such, the process 600 receives scripted code syntax from a user that specifies a data search of complex and/or distributed data, receives scripted code syntax from a user that specifies manipulation of the search results (e.g., filtering), and receives scripted code syntax from a user that specifies visualization output formatting for the manipulated search results. Within the present example, an HTTP POST request is used to encapsulate the respective scripted code segments to form the piped HTTP request, though it is understood that other implementations are possible and all such implementations are considered within the scope of the present subject matter. The piped HTTP response includes a rendering of the results of the piped HTTP request and the results are displayed to the user. As such, the user of a computing device may specify scripted code segments to be executed by a remote server to perform complex data search, manipulation, and visualization processing. Accordingly, complex data searches, data manipulations, along with data visualization of the manipulated search results, may be delegated to a server under user control by specification of scripted code syntax to be executed by the server to perform the requested operations.

FIG. 7 is a flow chart of an example of an implementation of a process 700 for processing piped hypertext transfer protocol (HTTP) requests and performing analytics based on a pipes programming model. The process 700 may execute, for example, at a server device such as the server_1 108 through the server_M 110. The examples of FIG. 7 may also be implemented using the example pseudo syntax described above in association with FIG. 4, though the specific syntax of those examples is not repeated for brevity. As described above, an HTTP POST construct is used for purpose of example to represent a piped HTTP request, though it is understood that other implementations are possible and all such implementations are considered within the scope of the present subject matter.

At decision point 702, the process 700 makes a determination as to whether a piped HTTP request that includes embedded scripted code segments has been detected, such as from one of the computing device_1 102 through the computing device_N 104. As described above, the embedded scripted code may specify requested data search, search result data manipulation, and manipulated search result data visualization processing. In response to determining that a piped HTTP request that includes the embedded scripted code segments has been detected, the process 700 creates a single execution thread to process the received piped HTTP request at block 704. As described above, this single created execution thread operates to implement the pipes programming model by executing the piped HTTP request and responding with a piped HTTP response. Further, as also described above, the execution of the scripted code segments formed in the respective scripting language may be performed in a native scripting language runtime associated with the scripted code segments by the single created execution thread. For example, the execution of the scripted code segments may be performed within a native Phython® scripting language runtime, a native JavaScript® scripting language runtime, a PHP: Hypertext Preprocessor (PHP) scripting language runtime, a native Perl scripting language runtime, or other native scripting language runtime based upon the syntactic encoding of the scripted code segments.

At block 706, the process 700 extracts the data search scripted code syntax, the data manipulation scripted code syntax, and the data visualization scripted code syntax from the received piped HTTP request. At block 708, the process 700 executes the extracted data search scripted code within the native scripting language runtime associated with the search scripted code. For example, the extracted data search scripted code may specify a requested distributed database search, such as of the distributed search cluster 236 described above of, for example, a per-tenant search within a multi-tenant system. At block 710, the process 700 executes the extracted data manipulation scripted code within the native scripting language runtime associated with the data manipulation scripted code. For example, the extracted data manipulation scripted code may specify a requested search result filtering or other processing of the search results. At block 712, the process 700 executes the extracted data visualization scripted code within the native scripting language runtime associated with the data visualization scripted code to generate the visualized manipulated search results as the output of the execution of the received embedded scripted code that specifies the requested data search, search result data manipulation, and manipulated search result data visualization processing. For example, the extracted data visualization scripted code may specify a requested graphical output formatting of the manipulated search result data or other output format, such as a pie chart, histogram, or other formatted output of the manipulated search results. The process 700 may identify a charting library that includes visualization output functions usable to generate the requested visualized manipulated search results. The process 700 may also select a charting library function to generate the requested visualized manipulated search results, and may generate the visualized manipulated search results using syntax that invokes the selected charting library function.

At block 714, the process 700 returns the visualized manipulated search results in response to receiving the piped HTTP request that includes the embedded scripted code that specifies the requested data search, search result data manipulation, and manipulated search result data visualization processing. The return of the visualized manipulated search results may be performed as a piped HTTP response by the single created thread that executed the received embedded scripted code to unify the processing and responsiveness of the piped HTTP request. At block 716, the process 700 terminates the single execution thread, and returns to decision point 702 and iterates as described above.

As such, the process 700 operates to receive and process piped HTTP requests. Embedded scripted code that specifies requested data search, search result data manipulation, and manipulated search result data visualization processing is executed by a single execution thread that is created to process the piped HTTP request. A piped HTTP response that includes visualized output of the manipulated search results is returned by the single execution thread. As such, the process 700 performs complex data searches, data manipulations, and data visualizations of the manipulated search results, that have been delegated to a server under user control by specification of scripted code syntax to be executed by the server to perform the requested operations.

As described above in association with FIG. 1 through FIG. 7, the example systems and processes provide analytics based on a pipes programming model. Many other variations and additional activities associated with analytics based on a pipes programming model are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving, at a server, a hypertext transfer protocol (HTTP) request that comprises embedded scripted code that specifies requested data search, search result data manipulation, and manipulated search result data visualization processing;
   executing the received embedded scripted code that specifies the requested data search, search result data manipulation, and manipulated search result data visualization processing;
   generating visualized manipulated search results as output of the execution of the received embedded scripted code that specifies the requested data search, search result data manipulation, and manipulated search result data visualization processing; and
   returning the visualized manipulated search results in response to receiving the HTTP request that comprises the embedded scripted code that specifies the requested data search, search result data manipulation, and manipulated search result data visualization processing,
   where executing the received embedded scripted code that specifies the requested data search, the search result data manipulation, and the manipulated search result data visualization processing at the server improves network utilization and improves data analytics processing by returning the visualized manipulated search results as a single HTTP response to the received HTTP request.

2. The method of claim 1, where a created single execution thread:
   executes the received embedded scripted code;
   generates the visualized manipulated search results; and
   returns the visualized manipulated search results in response to receiving the HTTP request that comprises the embedded scripted code that specifies the requested data search, search result data manipulation, and manipulated search result data visualization processing.

3. The method of claim 1, where:
   the embedded scripted code that specifies the requested data search processing comprises embedded scripted code that specifies a requested distributed database search.

4. The method of claim 1, where the embedded scripted code that specifies the requested search result data manipulation processing comprises embedded scripted code that specifies requested search result filtering.

5. The method of claim 1, where the embedded scripted code that specifies the requested manipulated search result data visualization processing comprises embedded scripted code that specifies graphical output formatting of the visualized manipulated search results.

6. The method of claim 1, where generating the visualized manipulated search results as the output of the execution of the received embedded scripted code that specifies the requested data search, search result data manipulation, and manipulated search result data visualization processing comprises:
   identifying a charting library that comprises visualization output functions usable to generate the requested visualized manipulated search results;
   selecting a charting library function to generate the requested visualized manipulated search results; and
   generating the visualized manipulated search results using syntax that invokes the selected charting library function.

7. The method of claim 1, where the HTTP request that comprises the embedded scripted code that specifies the requested data search, search result data manipulation, and manipulated search result data visualization processing comprises an HTTP POST request that comprises the embedded scripted code that specifies the requested data search, search result data manipulation, and manipulated search result data visualization processing.

8. A system, comprising:
a communication interface; and
a processor programmed to:
- receive, via the communication interface, a hypertext transfer protocol (HTTP) request that comprises embedded scripted code that specifies requested data search, search result data manipulation, and manipulated search result data visualization processing;
- execute the received embedded scripted code that specifies the requested data search, search result data manipulation, and manipulated search result data visualization processing;
- generate visualized manipulated search results as output of the execution of the received embedded scripted code that specifies the requested data search, search result data manipulation, and manipulated search result data visualization processing; and
- return the visualized manipulated search results in response to receiving the HTTP request that comprises the embedded scripted code that specifies the requested data search, search result data manipulation, and manipulated search result data visualization processing,
- where executing the received embedded scripted code that specifies the requested data search, the search result data manipulation, and the manipulated search result data visualization processing at the processor improves network utilization and improves data analytics processing by returning the visualized manipulated search results as a single HTTP response to the received HTTP request.

9. The system of claim 8, where a created single execution thread:
- executes the received embedded scripted code;
- generates the visualized manipulated search results; and
- returns the visualized manipulated search results in response to receiving the HTTP request that comprises the embedded scripted code that specifies the requested data search, search result data manipulation, and manipulated search result data visualization processing.

10. The system of claim 8, where:
- the embedded scripted code that specifies the requested data search processing comprises embedded scripted code that specifies a requested distributed database search; and
- the embedded scripted code that specifies the requested search result data manipulation processing comprises embedded scripted code that specifies requested search result filtering.

11. The system of claim 8, where the embedded scripted code that specifies the requested manipulated search result data visualization processing comprises embedded scripted code that specifies graphical output formatting of the visualized manipulated search results.

12. The system of claim 8, where, in being programmed to generate the visualized manipulated search results as the output of the execution of the received embedded scripted code that specifies the requested data search, search result data manipulation, and manipulated search result data visualization processing, the processor is programmed to:
- identify a charting library that comprises visualization output functions usable to generate the requested visualized manipulated search results;
- select a charting library function to generate the requested visualized manipulated search results; and
- generate the visualized manipulated search results using syntax that invokes the selected charting library function.

13. The system of claim 8, where the HTTP request that comprises the embedded scripted code that specifies the requested data search, search result data manipulation, and manipulated search result data visualization processing comprises an HTTP POST request that comprises the embedded scripted code that specifies the requested data search, search result data manipulation, and manipulated search result data visualization processing.

14. A computer program product, comprising:
a computer readable storage medium having computer readable program code embodied therewith, where the computer readable program code when executed on a computer causes the computer to:
- receive a hypertext transfer protocol (HTTP) request that comprises embedded scripted code that specifies requested data search, search result data manipulation, and manipulated search result data visualization processing;
- execute the received embedded scripted code that specifies the requested data search, search result data manipulation, and manipulated search result data visualization processing;
- generate visualized manipulated search results as output of the execution of the received embedded scripted code that specifies the requested data search, search result data manipulation, and manipulated search result data visualization processing; and
- return the visualized manipulated search results in response to receiving the HTTP request that comprises the embedded scripted code that specifies the requested data search, search result data manipulation, and manipulated search result data visualization processing,
- where executing the received embedded scripted code that specifies the requested data search, the search result data manipulation, and the manipulated search result data visualization processing at the computer improves network utilization and improves data analytics processing by returning the visualized manipulated search results as a single HTTP response to the received HTTP request.

15. The computer program product of claim 14, where a created single execution thread:
- executes the received embedded scripted code;
- generates the visualized manipulated search results; and
- returns the visualized manipulated search results in response to receiving the HTTP request that comprises the embedded scripted code that specifies the requested data search, search result data manipulation, and manipulated search result data visualization processing.

16. The computer program product of claim 14, where the embedded scripted code that specifies the requested data search processing comprises embedded scripted code that specifies a requested distributed database search.

17. The computer program product of claim 14, where the embedded scripted code that specifies the requested search result data manipulation processing comprises embedded scripted code that specifies requested search result filtering.

18. The computer program product of claim 14, where the embedded scripted code that specifies the requested manipulated search result data visualization processing comprises embedded scripted code that specifies graphical output formatting of the visualized manipulated search results.

19. The computer program product of claim 14, where in causing the computer to generate the visualized manipulated search results as the output of the execution of the received embedded scripted code that specifies the requested data search, search result data manipulation, and manipulated search result data visualization processing, the computer readable program code when executed on the computer causes the computer to:
- identify a charting library that comprises visualization output functions usable to generate the requested visualized manipulated search results;
- select a charting library function to generate the requested visualized manipulated search results; and
- generate the visualized manipulated search results using syntax that invokes the selected charting library function.

20. The computer program product of claim 14, where the HTTP request that comprises the embedded scripted code that specifies the requested data search, search result data manipulation, and manipulated search result data visualization processing comprises an HTTP POST request that comprises the embedded scripted code that specifies the requested data search, search result data manipulation, and manipulated search result data visualization processing.

* * * * *